United States Patent
Kim et al.

(10) Patent No.: US 9,564,999 B2
(45) Date of Patent: Feb. 7, 2017

(54) SPACE DIVISION MULTIPLE ACCESS FOR WIRELESS LAN, AND CHANNEL ESTIMATION FOR THE SAME

(75) Inventors: Byoung Hoon Kim, Anyang-si (KR); Yong Ho Seok, Anyang-si (KR); Andrey Lyakhov, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 176 days.

(21) Appl. No.: 13/139,168

(22) PCT Filed: Dec. 11, 2009

(86) PCT No.: PCT/KR2009/007435
§ 371 (c)(1),
(2), (4) Date: Jun. 10, 2011

(87) PCT Pub. No.: WO2010/068065
PCT Pub. Date: Jun. 17, 2010

(65) Prior Publication Data
US 2011/0243025 A1    Oct. 6, 2011

(30) Foreign Application Priority Data
Dec. 12, 2008 (KR) .................. 10-2008-0126488

(51) Int. Cl.
*H04W 24/00* (2009.01)
*H04L 5/00* (2006.01)
(Continued)

(52) U.S. Cl.
CPC ........... *H04L 5/0023* (2013.01); *H04B 7/0632* (2013.01); *H04L 5/006* (2013.01);
(Continued)

(58) Field of Classification Search
USPC .................................................. 370/329, 338
See application file for complete search history.

(56) References Cited

U.S. PATENT DOCUMENTS 6,473,467 B1   10/2002   Wallace et al.
7,403,486 B2    7/2008   Flask
(Continued)

FOREIGN PATENT DOCUMENTS

CN    1578242 A      2/2005
EP    1 533 717 A1   7/2005
(Continued)

OTHER PUBLICATIONS

De Courville et al., "VHTL6 Tutorial (VHTL< 6 GHz)", IEEE 802.11-08/0825r0, Jul. 13, 2008, Slides 1-19, XP17680946A.

*Primary Examiner* — Kevin C Harper
*Assistant Examiner* — Derrick V Rose
(74) *Attorney, Agent, or Firm* — Birch, Stewart, Kolasch & Birch, LLP

(57) ABSTRACT

Provided are space division multiple access for wireless local area network (WLAN), and channel estimation for the same. A frequency division multiple access technique and a space division multiple access technique based on competition are used together for channel access. The channel access method includes: a competition period for estimating channel characteristics for a plurality of stations and transmitting, to the plurality of stations, downlink schedule information or uplink schedule information based on the estimated channel characteristics; and a data transmission period for performing downlink transmission or uplink transmission with all or some of the plurality of stations in accordance with the downlink schedule information or the uplink schedule information.

2 Claims, 12 Drawing Sheets

(51) Int. Cl.
  *H04L 25/02* (2006.01)
  *H04B 7/06* (2006.01)
  *H04W 72/12* (2009.01)
  *H04W 74/02* (2009.01)
  *H04W 84/12* (2009.01)

(52) U.S. Cl.
  CPC .......... *H04L 5/0064* (2013.01); *H04L 5/0091* (2013.01); *H04L 25/0204* (2013.01); *H04W 24/00* (2013.01); *H04W 72/1289* (2013.01); *H04W 74/02* (2013.01); *H04W 84/12* (2013.01)

(56) References Cited

U.S. PATENT DOCUMENTS

| | | | |
|---|---|---|---|
| 7,616,602 B2 | 11/2009 | Choi et al. | |
| 2005/0165950 A1* | 7/2005 | Takagi | H04L 12/413 709/236 |
| 2005/0276237 A1 | 12/2005 | Segal et al. | |
| 2006/0146755 A1 | 7/2006 | Pan et al. | |
| 2006/0159004 A1 | 7/2006 | Ji | |
| 2006/0240780 A1 | 10/2006 | Zhu et al. | |
| 2006/0248429 A1 | 11/2006 | Grandhi et al. | |
| 2007/0086536 A1 | 4/2007 | Ketchum et al. | |
| 2007/0153754 A1* | 7/2007 | Shapira | H04W 16/10 370/338 |
| 2007/0189205 A1 | 8/2007 | Terry et al. | |
| 2007/0230373 A1 | 10/2007 | Li et al. | |
| 2008/0002636 A1 | 1/2008 | Gaur et al. | |
| 2008/0076348 A1 | 3/2008 | Sinnarajah et al. | |
| 2008/0108391 A1 | 5/2008 | Vau et al. | |
| 2008/0137627 A1* | 6/2008 | Fischer | H04W 16/14 370/338 |
| 2008/0165875 A1 | 7/2008 | Mundarath et al. | |
| 2008/0214198 A1 | 9/2008 | Chen et al. | |
| 2009/0103485 A1* | 4/2009 | Singh et al. | 370/329 |
| 2010/0046457 A1* | 2/2010 | Abraham | H04B 7/0408 370/329 |
| 2011/0235533 A1* | 9/2011 | Breit et al. | 370/252 |

FOREIGN PATENT DOCUMENTS

| | | |
|---|---|---|
| EP | 1672824 A2 | 6/2006 |
| JP | 2005-341603 A | 12/2005 |
| JP | 2006-295932 A | 10/2006 |
| JP | 2006-524969 A | 11/2006 |
| KR | 10-2005-0021687 A | 3/2005 |
| KR | 10-2005-0062359 A | 6/2005 |
| KR | 10-2008-0035002 A | 4/2008 |
| RU | 2339172 C2 | 11/2008 |
| WO | WO 2004/098072 A2 | 11/2004 |
| WO | WO 2006/107886 A3 | 10/2006 |
| WO | WO 2008/002972 A2 | 1/2008 |
| WO | WO 2008/084540 A1 | 7/2008 |

* cited by examiner

FIG. 5

| Action Category | Action Value | Channel Estimation Initiator | Channel Estimation Duration | Channel Estimation Recipient Set IE |
|---|---|---|---|---|
| Octets: 1 | 1 | 6 | 2 | Variable |

FIG. 6

| Element ID | Length | Channel Estimation Recipient | Feedback Channel |
|---|---|---|---|

Octets:   1         1              6                    1

FIG. 7

| Action Category | Action Value | Channel Estimation Initiator | Channel Estimation Recipient | Channel State Information Report |
|---|---|---|---|---|

Octets:  1  1  6  6  Variable

SPACE DIVISION MULTIPLE ACCESS FOR WIRELESS LAN, AND CHANNEL ESTIMATION FOR THE SAME

TECHNICAL FIELD

The present invention relates to a wireless local area network (WLAN), and more particularly, to multiple access and channel estimation in the WLAN.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

In the IEEE 802.11, the IEEE 802.11b supports a data rate of up to 11 Mbps by using a frequency band of 2.4 GHz. The IEEE 802.11a commercialized after the IEEE 802.11b uses a frequency band of 5 GHz instead of the frequency band of 2.4 GHz and thus significantly reduces influence of interference in comparison with the very congested frequency band of 2.4 GHz. In addition, the IEEE 802.11a has improved the data rate to up to 54 Mbps by using the OFDM technology. Disadvantageously, however, the IEEE 802.11a has a shorter communication distance than the IEEE 802.11b. Similarly to the IEEE 802.11b, the IEEE 802.11g implements the data rate of up to 54 Mbps by using the frequency band of 2.4 GHz. Due to its backward compatibility, the IEEE 802.11g is drawing attention, and is advantageous over the IEEE 802.11a in terms of the communication distance.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to 540 Mbps or higher, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

With the widespread use of the WLAN and the diversification of applications using the WLAN, there is a recent demand for a new WLAN system to support a higher throughput than a data processing rate supported by the IEEE 802.11n. A very high throughput (VHT) WLAN system is one of IEEE 802.11 WLAN systems which have recently been proposed to support a data processing rate of 1 Gbps or higher. The VHT system is named arbitrarily. To provide a throughput of 1 Gbps or higher, a feasibility test is currently being conducted for the VHT system using 4×4 MIMO and a channel bandwidth of 80 MHz. At present, in order for the VHT WLAN system to achieve an aggregated throughput of 1 Gbps, the use of a spatial division multiple access (SDMA) scheme is being actively researched as a channel access scheme together with the use of a channel bandwidth of 80 MHz or higher.

The conventional channel access mechanism used in the IEEE 802.11n WLAN system or other WLAN systems cannot be directly used as a channel access mechanism of a VHT WLAN system for providing a throughput of 1 Gbps or higher. This is because a channel bandwidth used by the VHT WLAN system is at least 80 MHz since the conventional WLAN system operates under the premise of using a channel bandwidth of 20 MHz or 40 MHz which is too narrow to achieve the throughput of 1 Gbps or higher in a service access point (SAP).

SUMMARY OF INVENTION

Technical Problem

The present invention provides a channel access method and apparatus capable of setting an aggregated throughput to 1 Gbps or higher in a wireless local area network (WLAN).

The present invention also provides a method and apparatus capable of performing channel estimation concurrently for a plurality of stations in a WLAN.

Technical Solution

According to an aspect of the present invention, there is provided a channel access method in a wireless local area network (WLAN). A frequency division multiple access technique and a space division multiple access technique based on competition are used together in this method.

In the aforementioned aspect of the present invention, the channel access procedure may include: a competition period for estimating channel characteristics for a plurality of very high throughput (VHT) stations and transmitting, to the plurality of VHT stations, downlink schedule information or uplink schedule information based on the estimated channel characteristics; and a data transmission period for performing downlink transmission or uplink transmission with respect to all or some of the plurality of VHT stations in accordance with the downlink schedule information or the uplink schedule information.

In addition, the competition period may include a channel estimation period for estimating a channel characteristic for each of the plurality of VHT stations by exchanging a specific message with respect to each of the plurality of VHT stations. The exchanged message may be a request to send (RTS)/clear to send (CTS) frame, a null data/acknowledgement (ACK) frame, or a channel estimation request/response frame.

According to another aspect of the present invention, there is provided a channel estimation method in a WLAN system. The method includes: transmitting for a plurality of VHT stations a request message including information on VHT stations requiring channel estimation and information on a sub-channel allocated for each of the VHT stations as a message for requesting channel through a full frequency bandwidth of the WLAN system; and receiving a response message including information indicating a channel estimation result from each of the plurality of VHT stations through a sub-channel allocated to the request message.

Advantageous Effects

According to the present invention, a channel characteristic is first estimated for downlink/uplink transmission by applying a contention-based spatial division multiple access (SDMA)/frequency division multiplex (FDM) scheme, and concurrent channel access of a plurality of very high throughput (VHT) stations (STAs) is allowed by creating downlink schedule or uplink schedule on the basis of the estimated channel characteristic, thereby being able to effectively use radio resources. In addition, a request message for channel estimation is transmitted by using a full frequency bandwidth of a system when estimating the channel characteristic, and a response message thereof is received through a sub-channel for each VHT STA, thereby being able to decrease overhead caused by channel estimation for the plurality of VHT STAs.

DESCRIPTION OF DRAWINGS

FIG. 5 is a diagram showing a format of a channel estimation request frame according to an embodiment of the present invention.

FIG. 6 is a diagram showing an exemplary format of a channel estimation recipient set information element included in a channel estimation request frame of FIG. 5.

FIG. 7 is a diagram showing a format of a channel estimation response frame according to an embodiment of the present invention.

MODE FOR INVENTION

Figure 1:
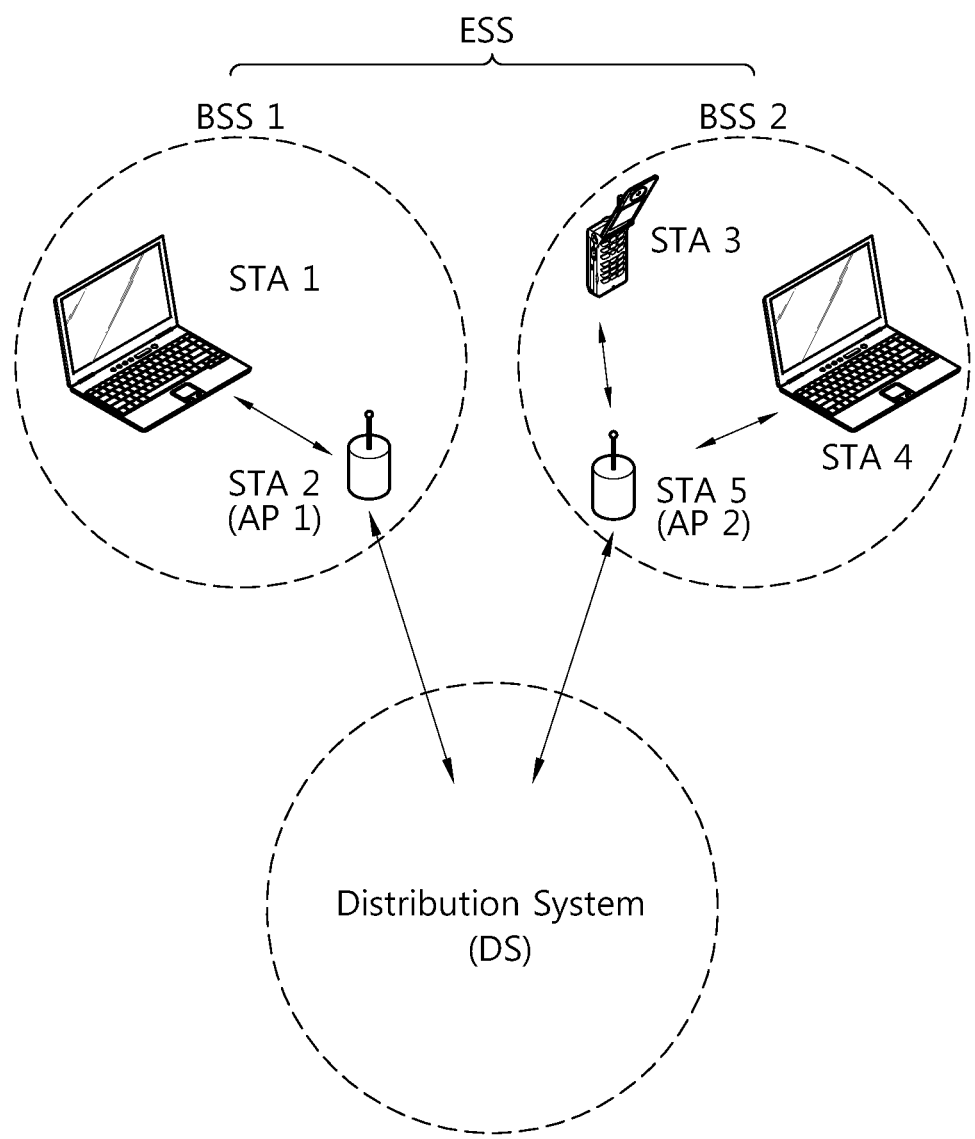
FIG. 1 is a schematic view showing an exemplary structure of a wireless local access network (WLAN) system according to an embodiment of the present invention.

FIG. 1 is a schematic view showing an exemplary structure of a wireless local access network (WLAN) system according to an embodiment of the present invention. The WLAN system includes one or more basis service sets (BSSs). The BSS is a set of stations (STAs) which are successfully synchronized to communicate with one another, and is not a concept indicating a specific region. The WLAN system to which the embodiment of the present invention is applicable is a very high throughput (VHT) WLAN system that supports a super high-speed data processing of 1 GHz or higher in a medium access control (MAC) service access point (SAP). A BSS in the VHT system is referred to as a VHT BSS.

The VHT BSS can be classified into an infrastructure BSS and an independent BSS (IBSS). The infrastructure BSS is shown in FIG. 1. Infrastructure BSSs (i.e., BSS1 and BSS2) include one or more non-access point (AP) STAs (i.e., Non-AP STA1, Non-AP STA3, and Non-AP STA4) which are STAs providing a distribution service, APs (i.e., AP STA1 and AP STA2) which are STAs providing a distribution service, and a distribution system (DS) connecting the plurality of APs (i.e., AP STA1 and AP STA2). In the infrastructure BSS, the AP STA manages the non-AP STAs of the BSS.

On the other hand, the IBSS is a BSS operating in an ad-hoc mode. Since the IBSS does not include the VHT STA, a centralized management entity for performing a management function in a centralized manner does not exist. That is, the IBSS manages the non-AP STAs in a distributed manner. In addition, in the IBSS, all STAs may consist of mobile STAs, and a self-contained network is configured since connection to the DS is not allowed.

The STA is an arbitrary functional medium including a medium access control (MAC) and wireless-medium physical layer interface conforming to the institute of electrical and electronics engineers (IEEE) 802.11 standard, and includes both an AP and a non-AP STA in a broad sense. A VHT STA is defined as an STA that supports the super high-speed data processing of 1 GHz or higher in the multi-channel environment to be described below. In the VHT WLAN system to which the embodiment of the present invention is applicable, STAs included in the BSS may be all VHT STAs, or a VHT STA and a legacy STA (i.e., IEEE 802.11n-based HT STA) may coexist.

The STA for wireless communication includes a processor and a transceiver, and also includes a user interface, a display means, etc. The processor is a functional unit devised to generate a frame to be transmitted through a wireless network or to process a frame received through the wireless network, and performs various functions to control STAs. The transceiver is functionally connected to the processor and is a unit devised to transmit and receive a frame for the STAs through the wireless network.

Among the STAs, non-AP STAs (i.e., STA1, STA3, STA4, STA6, STA7, and STA8 are portable terminals operated by users. A non-AP STA may be simply referred to as an STA. The non-AP STA may also be referred to as a terminal, a wireless transmit/receive unit (WTRU), a user equipment (UE), a mobile station (MS), a mobile terminal, a mobile subscriber unit, etc. A non-AP VHT-STA (or simply VHT STA) is defined as a non-AP STA that supports the super high-speed data processing of 1 GHz or higher in the multi-channel environment to be described below.

The AP (i.e., AP1 and AP2) is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT AP is defined as an AP that supports the super high-speed data processing of 1 GHz or higher in the multi-channel environment to be described below.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical construction for interconnecting APs.

Figure 2:
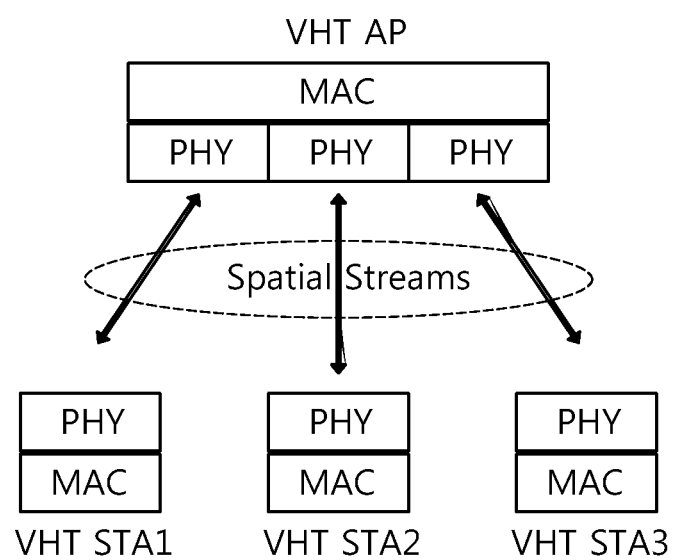
FIG. 2 is a diagram showing an exemplary structure of a spatial division multiple access (SDMA)-based very high through (VHT) WLAN system.

FIG. 2 is a diagram showing an exemplary structure of a spatial division multiple access (SDMA)-based VHT WLAN system. Herein, an infrastructure VHT BSS is used. The SDMA-based VHT WLAN system indicates a VHT WLAN system which uses an SDMA scheme as a multiple access scheme. Referring to FIG. 2, a VHT AP supporting the SDMA employs a plurality of physical (PHY) interfaces, for example, 3 PHY interfaces. The 3 PHY interfaces can provide 3 concurrent spatial streams. On the other hand, a non-AP VHT STA (hereinafter, referred to a 'VHT STA') has one PHY interface. Each PHY interface can support up to 4×4 MIMO.

In the SDMA-based VHT WLAN system shown in FIG. 2, in order for the VHT AP to concurrently provide spatial streams to a plurality of VHT STAs, the VHT STA must know channel characteristics for these VHT STAs. Therefore, in the SDMA-based VHT WLAN system, the VHT AP requires a channel estimation mechanism for each VHT STA.

As one method of estimating a channel for each of a plurality of VHT STAs which concurrently receive downlink (DL) streams from the VHT AP or transmit uplink (UL) streams according to the SDMA scheme, a sequential channel estimation procedure can be taken into account. According to the sequential channel estimation procedure, the VHT AP exchanges a request message and a response message for channel estimation sequentially to each VHT STA which is a target of DL/UL transmission. The request message and the response message can be transmitted through a full channel bandwidth of a system. Hereinafter, the sequential channel estimation procedure will be described in greater detail.

Figure 3:
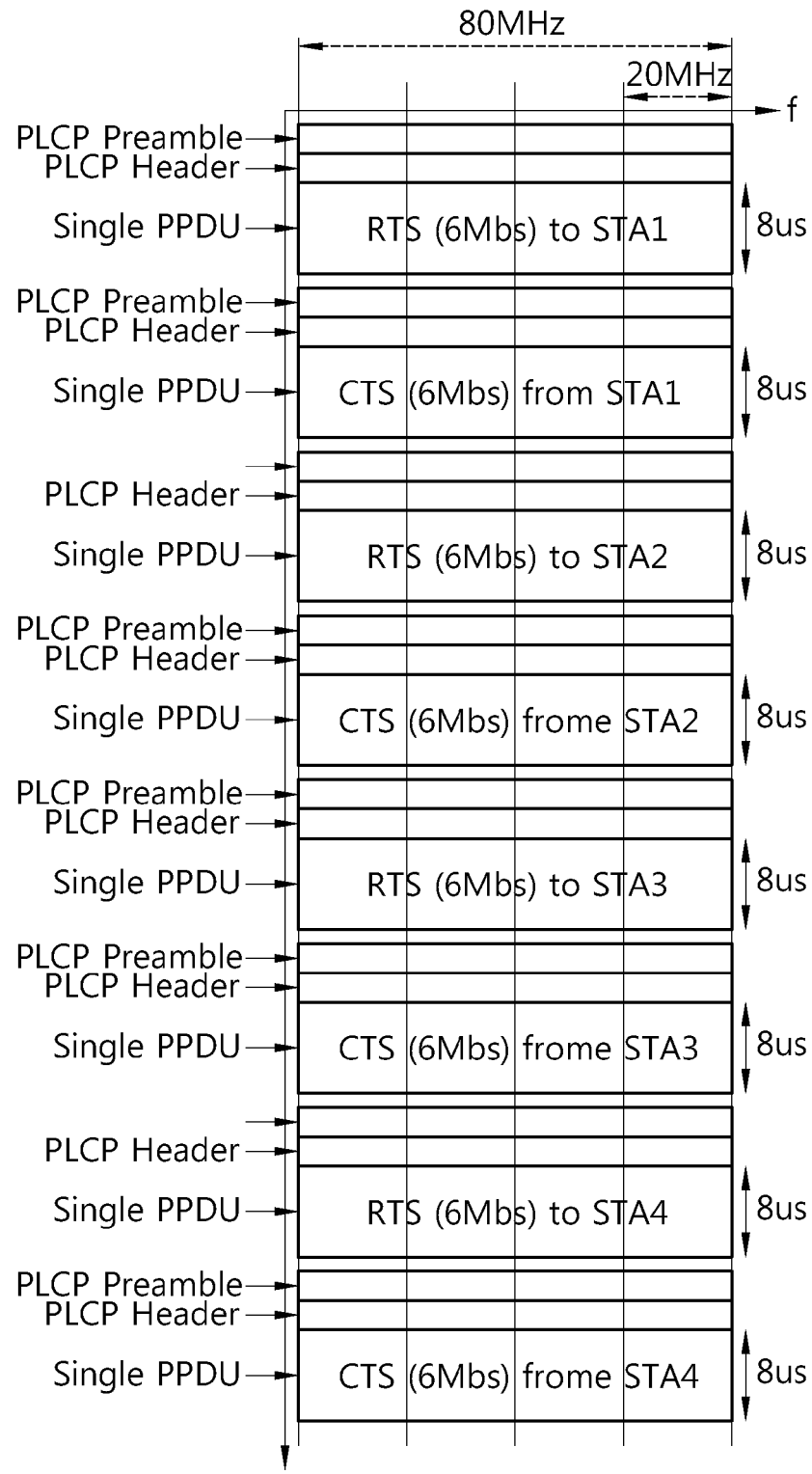
FIG. 3 is a diagram showing an example of a sequential channel estimation procedure in a VHT WLAN system.

FIG. 3 is a diagram showing an example of a sequential channel estimation procedure in a VHT WLAN system. In the sequential channel estimation procedure of FIG. 3, the VHT WLAN system uses an 80 MHz channel bandwidth and employs 4 VHT STAs which concurrently receive DL streams. Referring to FIG. 3, the VHT AP sequentially exchanges a request to send (RTS) frame and a clear to send (CTS) frame which are a request message and a response message for channel estimation through a full bandwidth of 80 MHz with respect to an STA1, an STA2, an STA3, and an STA4.

The sequential channel estimation procedure can be effective for estimation of channel characteristics of VHT STAs which concurrently access on the basis of the SDMA. However, the sequential channel estimation procedure has a disadvantage in that overhead is great. That is, when using the sequential channel estimation procedure, the VHT AP has to exchange the RTS frame and the CTS frame by the number of STAs located in the same space, and thus a signal processing amount may also increase to that extent. In addition thereto, a time required for the sequential channel estimation procedure may also increase according to the number of STAs, and thus if the number of STAs is great, more time is assigned for the channel estimation procedure, thereby decreasing a time that can be used for actual data transmission. Therefore, although the aforementioned sequential channel estimation procedure can be used as the channel estimation procedure in the VHT WLAN system, a certain limitation exists in this case.

As one method for compensating for the disadvantage of the sequential channel estimation procedure, the embodiment of the present invention proposes a parallel channel estimation procedure. The term 'parallel channel estimation procedure' is for exemplary purposes only. According to the parallel channel estimation procedure, the VHT AP transmits a request message for channel estimation to each VHT STA, which is a target of DL transmission, in a broadcast or multicast manner. Upon receiving the request message, the VHT STAs transmit a response message to the VHT AP through each sub-channel in a unicast manner. In this case, the request message may include information indicating a sub-channel to be used when each VHT STA transmits the response message. The VHT STA may transmit the response message to the VHT AP through a sub-channel included in the request message.

For example, in case of a VHT WLAN system using an 80 MHz channel bandwidth, 4 sub-channels each having a 20 MHz channel bandwidth can be used. In addition, if it is assumed that 4 beamforming antennas are supported by the VHT AP, the number of DL transmission concurrently supported is 4. If a VHT STA which is a target of DL transmission is the STA1, the STA2, the STA3, and the STA4, then a sub-channel 1, a sub-channel 2, a sub-channel 3, and a sub-channel 4 can be respectively allocated to the STA1, the STA2, the STA3, and the STA4 for example.

Figure 4:
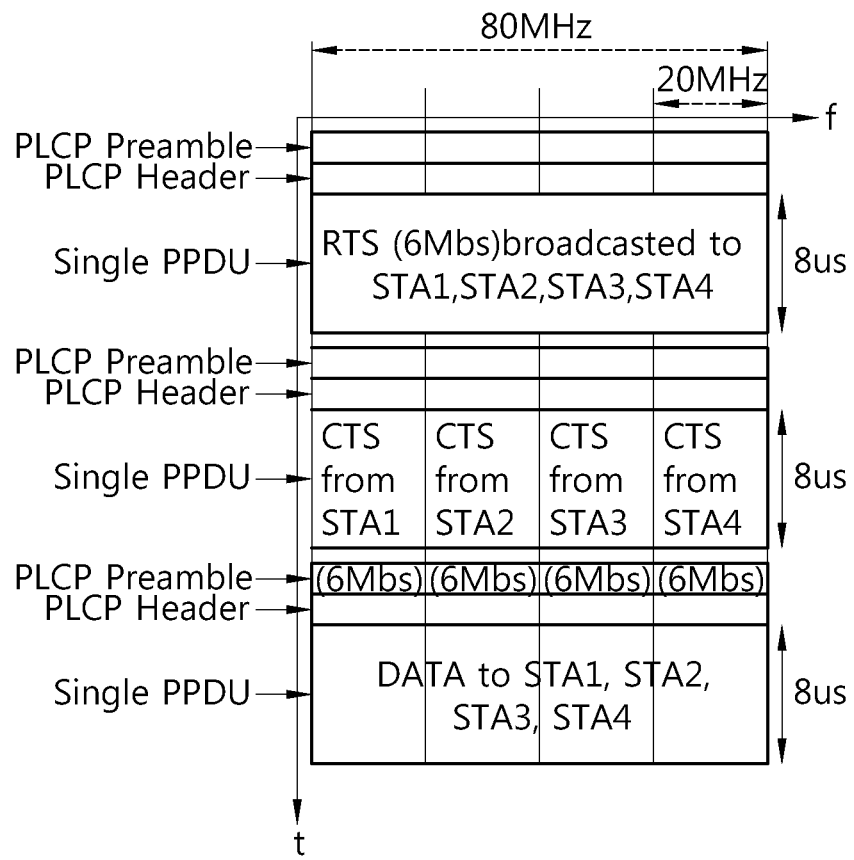
FIG. 4 is a diagram showing an example of a parallel channel estimation procedure in a VHT WLAN system.

FIG. 4 is a diagram showing an example of a parallel channel estimation procedure in a VHT WLAN system. In the example of the parallel channel estimation procedure shown in FIG. 4, the VHT WLAN system uses an 80 MHz channel bandwidth and has 4 VHT STAs concurrently receiving DL streams. Referring to FIG. 4, a VHT AP broadcasts a 'request message' for channel estimation through a full bandwidth of 80 MHz for all of an STA1, an STA2, an STA3, and an STA4. Each STA performs channel estimation by using the received request message, and thereafter transmits a 'response message' including channel estimation information to the VHT AP. In this case, the response message may be transmitted through a sub-channel having a channel bandwidth of 20 MHz, and each STA uses a different sub-channel. In order for each STA to be able to use the different sub-channel, together with information on an STA which is a target of channel estimation, the request message includes information on a sub-channel to be used when the STA transmits the response message.

In FIG. 4, an RTS frame and a CTS frame are used as a request message for channel estimation and a response message thereof. However, the present embodiment is not limited thereto, and thus in addition to a pair of the CTS frame and the RTS frame, a pair of a null data frame and an ACK frame, a pair of a channel estimation request frame and a channel estimation response frame, or the like can be used as a pair of the request message and the response message.

As described above, the request message (i.e., the RTS frame, the null data frame, the channel estimation request frame, or the like) according to the embodiment of the present invention includes information on an STA which is a target of channel estimation and information regarding a sub-channel to be used when each STA transmits a response message. Such information may be added as a new information element (IE) to the existing frame or may be added as a new field, and there is no particular restriction on the adding mechanism. Hereinafter, an exemplary format of a 'channel estimation request frame' and a 'channel estimation response frame' will be described as an example of a frame including the aforementioned information. Another frame (e.g., an RTS/CTS frame or a null data/ACK frame) can have a format in which essential information or fields are added to the existing format, and description thereof will be omitted.

FIG. 5 is a diagram showing a format of a channel estimation request frame according to an embodiment of the present invention.

Referring to FIG. 5, the channel estimation request frame includes an action category field, an action value field, a channel estimation initiator field, a channel estimation duration field, and a channel estimation recipient set information element (IE) field. The action category field may be set to a value indicating a category of an action to which a channel estimation response frame belongs, for example, a management action category. The action value field may be set to a specific value indicating a 'channel estimation response' action. The channel estimation initiator field is set to an address of an STA for transmitting the channel estimation request frame. The channel estimation duration field is set to a value indicating a duration of a channel estimation sequence.

In addition, together with an address of an STA requiring channel estimation for DL transmission through the channel estimation request frame or an STA that must transmit the channel estimation response frame, the channel estimation recipient set IE field may be set to a value indicating a sub-channel to be used when the STA must transmit the channel estimation response frame.

FIG. 6 is a diagram showing an exemplary format of a channel estimation recipient set IE. Referring to FIG. 6, the channel estimation recipient set IE may include an element identifier (ID) field, a length field, a channel estimation recipient field, and a feedback channel field. The element ID field is set to a specific value indicating the channel estimation recipient set IE. The length field is set to a value indicating the length of subsequent fields (i.e., the channel estimation recipient field and the feedback channel field). The channel estimation recipient field includes a value for specifying an STA that becomes a target of DL transmission and thus has to transmit the channel estimation response frame, for example, address information of the STA. The feedback channel field is set to a value indicating a sub-channel to be used when the STA specified in the channel estimation recipient field transmits the channel estimation response frame.

FIG. 7 is a diagram showing a format of a channel estimation response frame according to an embodiment of the present invention.

Referring to FIG. 7, the channel estimation response frame includes an action category field, an action value field, a channel estimation initiator field, a channel estimation recipient field, and a channel state information report field. The action category field may be set to a value indicating a category of an action to which a channel estimation response frame belongs, for example, a management action category. The action value field may be set to a specific value indicating a 'channel estimation response' action. In addition, the channel estimation initiator field may be set to an address of an STA for transmitting the channel estimation request frame, that is, a value set to the channel estimation initiator field of the received channel estimation request frame. In addition, the channel estimation recipient field is set to an address of an STA for transmitting the channel estimation response frame, that is, an address of an STA that generates a channel estimation value included in the subsequent channel state information report field. The channel state information report field is set to the channel estimation value.

Now, an SDMA procedure in a VHT WLAN system which uses channel information obtained through the aforementioned sequential channel estimation procedure and/or parallel channel estimation procedure will be described.

As described above, the VHT WLAN system uses a wideband channel having a bandwidth of 80 MHz or higher. The wideband channel can be split into a plurality of sub-channels having the same or different bandwidths (e.g., 20 MHz). Several methods are proposed as a method of using the wideband channel in the VHT WLAN system.

Figure 8:
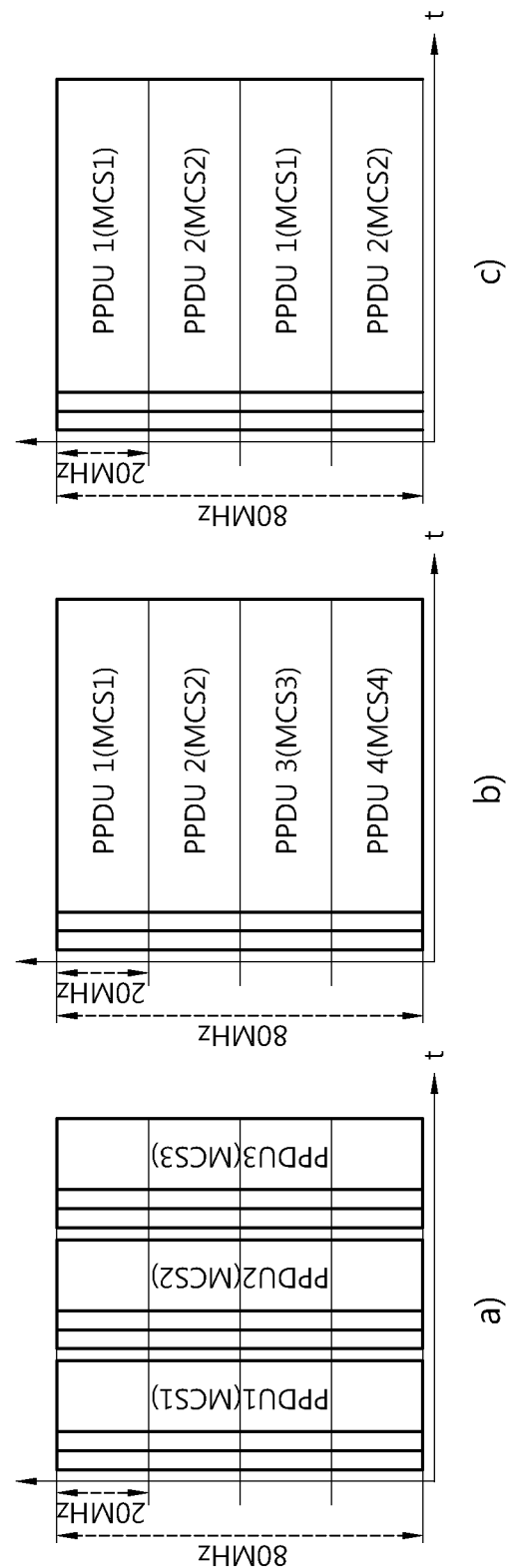
FIG. 8 shows an example of several methods using an 80 MHz channel.

FIG. 8 shows an example of several methods using an 80 MHz channel. A VHT WLAN system may use any one of methods described below or a combination of several methods. Alternatively, different methods can be used in DL and UL scenarios.

FIG. 8(a) shows a channel bonding scheme. According to the channel bonding scheme, one STA uses a full wideband channel. That is, a set of sub-channels is used as a single wideband. However, as explained in the aforementioned channel estimation procedure, the channel bonding channel shown in FIG. 8(a) may cause a relatively great overhead. In addition, FIG. 8(b) shows a channel aggregation scheme. According to this scheme, a plurality of sub-channels can be used independently by one STA. In this case, the STA can concurrently transmit a plurality of frames, and each frame is transmitted through a different sub-channel. In FIG. 8(a) and FIG. 8(b), MCS denotes a modulation and coding scheme. On the other hand, FIG. 8(c) shows a frequency division multiplex (FDM) scheme. In this case, several STAs can concurrently transmit frames through different sub-channels.

In the SDMA procedure of VHT WLAN system according to an embodiment of the present invention, the SDMA scheme is combined to the FDM scheme of FIG. 8(c) when performing UL or DL data transmission. However, contention-based carrier sense multiple access/collision avoidance (CSMA/CA) is premised in IEEE 802.11 MAC. Therefore, the contention-based mechanism has to be considered to combine SDMA and FDM for use in the WLAN system. In addition, in order for a VHT AP to successfully receive frames transmitted by a plurality of STAs, UL transmission must to be synchronized between STAs which use different sub-channels.

For this, in the SDMA procedure according to the embodiment of the present invention in the VHT WLAN system, a WLAN operation time can be divided into a contention mode and, optionally, a contention-free mode. Whether to include the contention-free mode is not particularly restricted in the embodiment of the present invention, and thus may differ depending on a protocol of the VHT WLAN system. As described below, in the contention-free mode, the VHT AP schedules UL transmission and DL transmission on the basis of a specific criterion. In a method that can be used in the contention-free mode, scheduling information on UL transmission and DL transmission can be transmitted by the VHT AP by using the same polling as that of a power save multi-poll (PSMP) sequence.

According to the embodiment of the present invention, the contention mode is divided into contention periods and data transmission periods that follow the contention periods. In the contention periods, the VHT AP and one or more VHT STAs contend to obtain a channel by using the CSMA/CA procedure performed in a full wideband channel (e.g., an 80 MHz channel). If the VHT AP wins in this competition, a DL phase starts. If the VHT STA wins, a UL phase starts.

Figure 9:
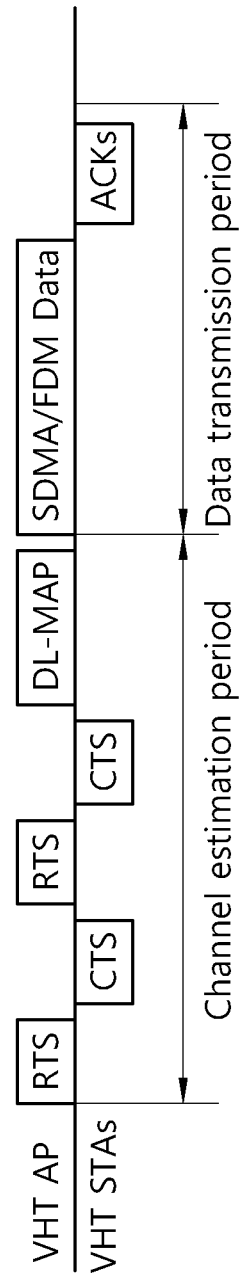
FIG. 9 is a diagram showing an exemplary procedure in a downlink phase during an SDMA procedure according to an embodiment of the present invention.

FIG. 9 is a diagram showing an exemplary procedure in a DL phase during an SDMA procedure according to an embodiment of the present invention. Referring to FIG. 9, the DL phase includes a channel estimation period and a data transmission period. Herein, the channel estimation period is an arbitrary period.

In the channel estimation period, the VHT AP exchanges an RTS/CTS frame or exchanges a null data/ACK frame or a channel estimation request/response frame with one or more VHT STAs of which a channel characteristic needs to be estimated and which has data to be transmitted. Thus, the VHT AP estimates a channel characteristic of each VHT STA on the basis of the aforementioned channel estimation procedure (e.g., the parallel channel estimation procedure and/or the sequential channel estimation procedure) according to the embodiment of the present invention.

After the completion of the channel estimation, the VHT AP transmits sub-channel information (e.g., frequency allocation information) allocated for DL transmission to each VHT STA together with information on VHT STAs (e.g., a list of VHT STAs) for transmitting data in the subsequent data transmission period. If the VHT AP transmits data having a group address to the VHT STAs, then sub-channel information (e.g., frequency allocation information) allocated for DL transmission to the group address together with group address information is transmitted to VHT STAs subscribed to the group address. Such information can be transmitted by using a DL-MAP frame, and the term is for exemplary purposes only.

Upon the completion of the channel estimation period by transmission of the DL-MAP frame, the data transmission period starts. In the data transmission period, data (i.e., SDMA/FDM data) starts to be transmitted concurrently to a plurality of VHT STAs by using the SDMA/FDM scheme. According to the SDMA/FDM scheme, the VHT AP divides (in an FDM manner) a full frequency band (e.g., an 80 MHz channel) into two or more sub-channels. The VHT AP transmits data concurrently to the plurality of VHT STAs by using the SDMA scheme independently in each sub-channel.

When using unicast transmission other than multicast transmission or broadcast transmission, an STA which receives a data frame needs to transmit an ACK frame to a transmitting STA. Therefore, when the VHT AP transmits DL data to several VHT STAs by using the SDMA scheme, each VHT STA responds to the VHT AP by sending the ACK frame. A time required for each VHT STA to transmit the ACK frame can be scheduled by the VHT AP.

The VHT AP can allow VHT STAs, which concurrently receive data, to have the same data transmission time. In order to allow a transmission time to be the same for all data frames transmitted by the SDMA scheme, the VHT AP can use an aggregation technique or a MAC service data unit (MSDU) fragmentation technique conforming to the IEEE 802.11 WLAN standard. Alternatively, according to data to be transmitted to a VHT STA having a longest data transmission time, the VHT AP can allow a data frame, which is to be transmitted to another VHT STA, to have the same transmission time by inserting zero (i.e., zero padding technique). Upon the completion of data transmission, VHT STAs which receive the data transmit the ACK frame (indicated by ACKs in the figure) to the VHT AP through the same channel.

The MSDU fragmentation technique/aggregation technique or the zero padding technique can be usefully utilized when DL traffic to be transmitted to receiving VHT STAs is not constant between the VHT STAs. Therefore, such techniques enable concurrent data frame transmission through different channels by using an aggregate-physical layer convergence procedure protocol data unit (A-PPDU) or A-MPDU.

Figure 10:
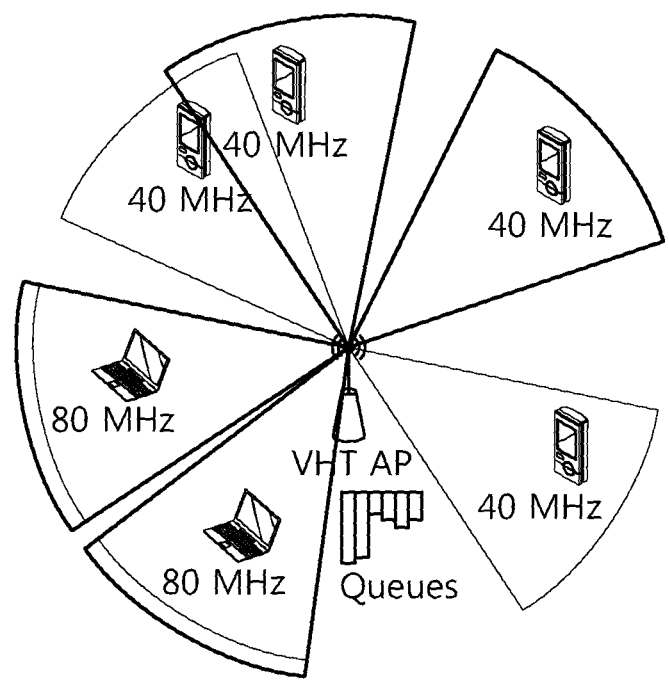
FIG. 10 is a diagram showing concurrent data transmission to a plurality of VHT stations (STAs) on the basis of an SDMA/frequency division multiplex (FDM) scheme according to an embodiment of the present invention.

FIG. 10 is a diagram showing concurrent data transmission to a plurality of VHT STAs on the basis of an SDMA/FDM scheme according to an embodiment of the present invention. The diagram of FIG. 10 shows an example in which a VHT AP transmits 4 SDMA streams through one channel while transmitting data concurrently to 6 VHT STAs. In FIG. 10, it can be seen that a 40 MHz channel is allocated for data transmission to the 4 VHT STAs (e.g., personal digital assistant (PDA)) since they are terminals which have relatively small data traffic to be transmitted or which support only 40 MHz, and an 80 MHz channel is allocated for data transmission to the remaining 2 VHT STAs (e.g., a laptop computer) since data traffic to be transmitted is relatively great.

As shown in the example of FIG. 10, if the SDMA/FDM scheme according to the embodiment of the present invention is used as a multiple access scheme, the VHT AP can effectively allocate a spatial/frequency resource by considering an amount of data which is being buffered for each VHT STA or QoS delay requirements. Therefore, by using the embodiment of the present invention, a channel having a wideband (i.e., 80 MHz or higher) can be optimally utilized, and the QoS delay requirements can be satisfied.

Figure 11:
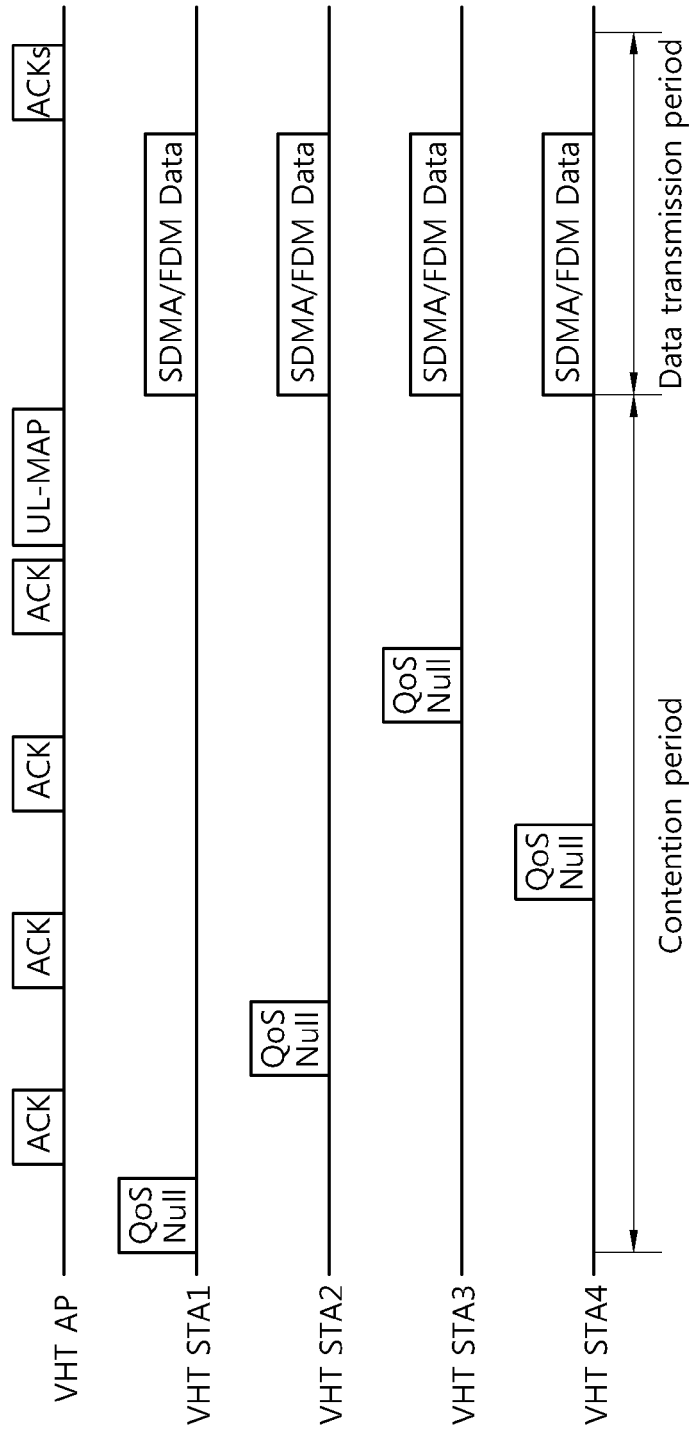
FIG. 11 is a diagram showing an exemplary procedure in an uplink phase during an SDMA procedure according to an embodiment of the present invention.

FIG. 11 is a diagram showing an exemplary procedure in a UL phase during an SDMA procedure according to an embodiment of the present invention. Referring to FIG. 11, the UL phase includes a contention period and a data transmission period.

In the contention period of the UL phase, a VHT AP receives an access request from VHT STAs. There is no particular restriction on a message that can be used by the VHT STA for the access request for UL transmission. However, the message may include information indicating an amount (i.e., a queue size) of data being buffered by the VHT STA which transmits the message. The amount of buffering data is provided for use when a spatial/frequency resource is allocated to each VHT STA which transmits the access request according to the SDMA/FDM scheme.

For example, the VHT STA may request a UL access by transmitting a null data frame or a QoS null frame to the VHT AP. Upon receiving the QoS null frame from the VHT STA, the VHT AP estimates a channel characteristic for the VHT STA by using the received frame, and also transmits an ACK frame in response thereto. Although it is shown in the procedure of FIG. 11 that the VHT AP sequentially exchanges the QoS null frame and the ACK frame of a VHT STA1, a VHT STA2, a VHT STA4, and a VHT STA3 during a contention period, such an order is for exemplary purposes only.

In addition, by considering an amount of buffering data, for each VHT STA, included in the QoS null frame received from a plurality of VHT STAs, the VHT AP allocates a spatial and frequency resource to each VHT STA so as to achieve optimal efficiency. Of course, a location of the VHT STA needs to be taken into account when allocating the spatial resource. Allocation of the spatial and frequency resource can start when the received access request is enough to reach optimal spatial/frequency allocation or reaches a limited UL contention time.

In addition, the VHT AP generates a message including information on spatial and frequency resources allocated to each VHT STA. The message may be a UL-MAP, and the term is for exemplary purposes only. In addition, after a last ACK frame is transmitted, the VHT AP transmits a generated UL-MAP frame to the VHT STAs. A specific frame interval (e.g., a short inter frame space (SIFS) or a point inter frame space (PIFS)) may exist between transmissions of the last ACK frame and the UL-MAP frame. The UL-MAP frame can be transmitted in a broadcast manner. When the UL-MAP frame is broadcast, the contention period of the UL phase ends.

The UL-MAP frame may include the following information. First, the UL-MAP frame may include information indicating a duration of a data transmission period. The UL-MAP frame may include information (e.g., a VHT STA list) on a VHT STA for which UL transmission is allowed in the data transmission period, and may include information on frequency allocated to each VHT STA. In addition, according to an embodiment, the UL-MAP frame may also include information on data transmission in a waiting status. The data transmission in the waiting status indicates a transmission opportunity in the subsequent data transmission period even if the QoS null frame and the ACK frame are exchanged in the contention period, that is, indicates UL transmission for a VHT STA to which no frequency is allocated. The data transmission in the waiting status may include information on frequency allocated in a data transmission period of a next UL phase. In this case, the VHT STA may not need to transmit the QoS null frame again to the VHT AP in order to obtain a UL transmission opportunity.

If the contention period ends by transmission of the UL-MAP frame, a UL data transmission period starts. As soon as the UL-MAP frame is received, VHT STAs for which UL transmission is allocated transmit data concurrently through a channel of an allocated frequency by using the MSDU aggregation technique or the fragmentation technique or the zero padding technique. That is, the VHT STAs concurrently transmit data frames to the VHT AP by using the SDMA/FDM scheme. Herein, the VHT STA uses the MSDU aggregation technique so that a frame to be transmitted satisfies QoS requirements or can be completely transmitted within a duration of UL transmission indicated by the UL-MAP frame. In addition, after receiving data from the VHT STAs, the VHT AP transmits the ACK frame to the VHT STAs by using the same spatial/frequency resource.

Meanwhile, according to an aspect of the embodiment of the present invention, after the end of a DL phase and a UL phase, the VHT AP can switch to a contention-free mode, that is, a multi-channel power save multi-poll (PSMP) mode. The switching to the contention-free mode can be achieved by considering QoS requirements or an amount of data which is being buffered for VHT STAs. That is, if it is determined that the spatial/frequency resource is more effectively allocated in the contention-free mode in comparison with the contention mode according to the QoS requirements or the amount of data being buffered, then the spatial/frequency resource for DL/UL transmission of VHT STAs can be allocated in the contention-free mode rather than the contention mode according to the aforementioned embodiment of the present invention during a specific time period.

Figure 12:
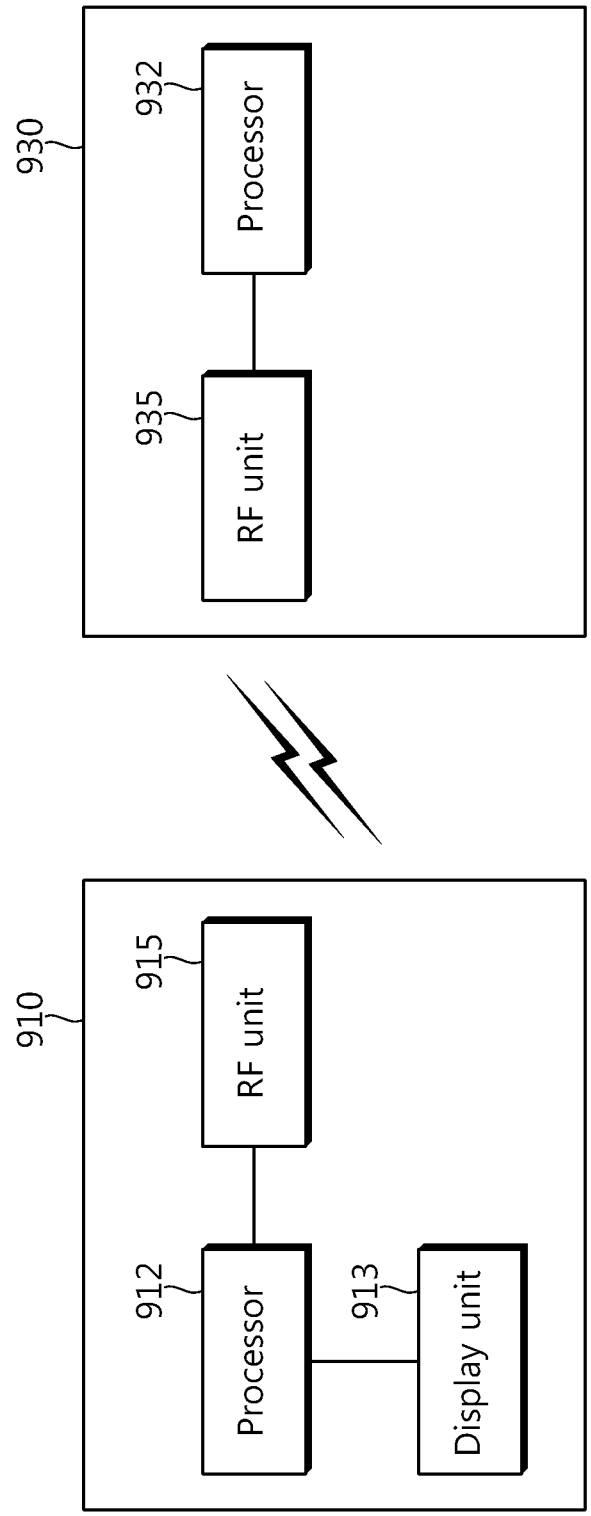
FIG. 12 is a block diagram showing a wireless communication system for implementing an embodiment of the present invention.

FIG. 12 is a block diagram showing a wireless communication system for implementing an embodiment of the present invention. A UE 910 includes a processor 912, a display unit 913, and a radio frequency (RF) unit 915. In the aforementioned embodiment, an operation of an MS can be implemented by the processor 912. The display unit 913 is coupled to the processor 912, and displays a variety of information to a user. The display unit 193 can use well-known elements such as a liquid crystal display (LCD), an organic light emitting diode (OLED), etc. The RF unit 915 is coupled to the processor 912, and transmits and receives a radio signal.

A BS 930 includes a processor 932 and an RF unit 935. The RF unit 935 transmits and receives a radio signal. In the aforementioned embodiment, an operation of the BS or a femto cell can be implemented by the processor 932.

The processors 912 and 932 may include an application-specific integrated circuit (ASIC), a separate chipset, a logic circuit, and/or a data processing unit. The memories 915 and 935 may include a base-band circuit for processing a radio signal. When the embodiment of the present invention is implemented in software, the aforementioned methods can be implemented with a module (i.e., process, function, etc.) for performing the aforementioned functions. The module can be executed by the processors 912 and 932.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

Various modifications may be made in the aforementioned embodiments. Although all possible combinations of the various modifications of the embodiments cannot be described, those ordinary skilled in that art will understand possibility of other combinations. Therefore, the present invention is not intended to be limited to the embodiments shown herein but is to be accorded the widest scope consistent with the principles and novel features disclosed herein.

The invention claimed is:

1. A method of transmitting data for multiple input multiple output (MIMO) in a wireless local access network, the method comprising:
broadcasting, by an access point, a channel request frame to request a channel feedback for a plurality of recipients over a bandwidth in which a downlink channel estimation is to be performed, the channel request frame including an initiator field and a recipient set field, the initiator field indicating an address of the access point, the recipient set field including a plurality of subfields indicating the plurality of recipients, each of the plurality of subfields including a recipient field indicating an identifier for a corresponding one of the plurality of recipients;

transmitting, by the access point, to the plurality of recipients, a null data packet frame commonly used for the downlink channel estimation after broadcasting the channel request frame;

sequentially receiving, by the access point, from each of the plurality of recipients, a channel response frame including a channel state for a MIMO channel that is estimated by a corresponding recipient based on the null data packet frame; and transmitting, by the access point, to the plurality of recipients, a data frame by using a MIMO transmission after receiving the channel response frame, the data frame including a group address and a plurality of aggregate-medium access control (MAC) protocol data units (A-MPDUs) for the plurality of recipients, wherein the group address indicates a station group to which the plurality of recipients belongs, wherein each of the plurality of A-MPDUs includes at least one MPDU for a corresponding one of the plurality of recipients, and wherein each of the plurality of A-MPDUs further includes zero or more padding bits so that all of the plurality of A-MPDUs have a same transmission time corresponding to a transmission time of a longest A-MPDU among the plurality of A-MPDUs.

2. An apparatus for transmitting data for multiple input multiple output (MIMO) in a wireless local access network, the apparatus comprising:

a radio frequency unit configured to receive and transmit radio signals; and a processor coupled with the radio frequency unit and configured to:

control the radio frequency unit to broadcast a channel request frame to request a channel feedback for a plurality of recipients over a bandwidth in which a downlink channel estimation is to be performed, the channel request frame including an initiator field and a recipient set field, the initiator field indicating an address of the wireless apparatus, the recipient set field including a plurality of subfields indicating the plurality of recipients, each of the plurality of subfields including a recipient field indicating an identifier for a corresponding one of the plurality of recipients, control the radio frequency unit to transmit, to the plurality of recipients, a null data packet frame commonly used for the downlink channel estimation after broadcasting the channel request frame, control the radio frequency unit to sequentially receive, from each of the plurality of recipients, a channel response frame including a channel state for a MIMO channel that is estimated by a corresponding recipient based on the null data packet frame, and control the radio frequency unit to transmit, to the plurality of recipients, a data frame by using a MIMO transmission after receiving the channel response frame, the data frame including a group address and a plurality of aggregate-medium access control (MAC) protocol data units (A-MPDUs) for the plurality of recipients, wherein the group address indicates a station group to which the plurality of recipients belongs, wherein each of the plurality of A-MPDUs includes at least one MPDU for a corresponding one of the plurality of recipients, and wherein each of the plurality of A-MPDUs further includes zero or more padding bits so that all of the plurality of A-MPDUs have a same transmission time corresponding to a transmission time of a longest A-MPDU among the plurality of A-MPDUs.

* * * * *